(12) United States Patent
Ambartsoumian (10) Patent No.: US 12,283,205 B2
(45) Date of Patent: Apr. 22, 2025

(54) SELF-LAMINATING LABEL ASSEMBLY AND METHOD FOR USING THE SAME

(71) Applicant: Gourgen Ambartsoumian, Laval (CA)

(72) Inventor: Gourgen Ambartsoumian, Laval (CA)

(*) Notice: Subject to any disclaimer, the term of this patent is extended or adjusted under 35 U.S.C. 154(b) by 163 days.

(21) Appl. No.: 17/921,757

(22) PCT Filed: May 12, 2021

(86) PCT No.: PCT/CA2021/050660
§ 371 (c)(1),
(2) Date: Oct. 27, 2022

(87) PCT Pub. No.: WO2021/226717
PCT Pub. Date: Nov. 18, 2021

(65) Prior Publication Data
US 2023/0162623 A1 May 25, 2023

Related U.S. Application Data

(60) Provisional application No. 63/025,288, filed on May 15, 2020.

(51) Int. Cl.
*G09F 3/00* (2006.01)
*G09F 3/02* (2006.01)
*G09F 3/20* (2006.01)

(52) U.S. Cl.
CPC ............ *G09F 3/0289* (2013.01); *G09F 3/208* (2013.01); *G09F 2003/0229* (2013.01); *G09F 2003/0255* (2013.01)

(58) Field of Classification Search
CPC ............ G09F 3/0289; G09F 3/208; G09F 2003/0229; G09F 2003/0255; B32B 3/02;
(Continued)

(56) References Cited

U.S. PATENT DOCUMENTS 5,083,979 A * 1/1992 Burt ................. G09F 3/02
283/67
5,902,440 A * 5/1999 Jenkins .............. B31D 1/021
156/239

(Continued)

FOREIGN PATENT DOCUMENTS

CA 979601 A1 12/1975
WO 2017042229 A1 3/2017

OTHER PUBLICATIONS

Blitshteyn, M., "Mastering RFID Label Converting". Conference proceeding: Paper, Film and Foil Converter, RFID Journal, 2005, pp. 14 in total, [online] [retrieved on Jun. 30, 2021 (Jun. 30, 2021)]. Retrieved from the Internet: <https://www.rfidjournal.com/wp-content/uploads/2019/07/68.pdf.

(Continued)

*Primary Examiner* — Patricia L. Nordmeyer
(74) *Attorney, Agent, or Firm* — Hahn Loeser & Parks LLP (57) ABSTRACT

Self-laminating label assemblies, self-laminating labels and methods for laminating label facestocks are described herein. The self-laminating label assemblies may include a label support liner and one or more self-laminating label(s) releasably affixed to the label support liner. Each self-laminating label may include a label facestock releasably affixed to the label support liner and a laminating facestock for at least partially laminating the label facestock. The laminating facestock may be releasably affixable to the label support liner, directly or indirectly, and may be provided between a non-laminating configuration in which at least part of the aminating facestock is releasably affixed to the label support liner for holding the laminating facestock thereon or thereabout, and a aminating configuration in (Continued)

which the laminating facestock is at least partially affixed to, and laminates, the label facestock.

28 Claims, 6 Drawing Sheets

(58) Field of Classification Search
CPC ............ B32B 2255/02; B32B 2255/10; B32B 2255/12; B32B 7/05; B32B 2255/26; B32B 2307/518; B32B 27/281; B32B 2307/748; B32B 5/022; B32B 7/14; B32B 25/20; B32B 27/08; B32B 27/10; B32B 27/12; B32B 27/302; B32B 27/304; B32B 27/32; B32B 27/34; B32B 27/36; B32B 29/00; B32B 2307/75; B32B 2519/00; B32B 7/12; B32B 27/308
See application file for complete search history.

(56) References Cited

U.S. PATENT DOCUMENTS

2009/0053450 A1\* 2/2009 Kobayashi ................ G09F 3/02
 428/42.1
2015/0279242 A1\* 10/2015 Parks ........................ G09F 3/02
 428/41.7

OTHER PUBLICATIONS

International Search Report and Written Opinion for PCT/CA2021/050660 dated Jul. 19, 2021, 16 pages.

\* cited by examiner

SELF-LAMINATING LABEL ASSEMBLY AND METHOD FOR USING THE SAME

TECHNICAL FIELD

The technical field generally relates to laminated labels. More particularly, the technical field relates to self-laminating label assemblies and to methods for using the same.

BACKGROUND

A typical self-laminating label assembly can include a label support liner, as well as one or more self-laminating label(s) releasably affixed thereto. For example, each self-laminating label can include a label facestock releasably affixed to the label support liner and a laminating facestock affixable to the label facestock for covering and laminating the same, at least partially. The label facestock is typically a printable label facestock and can be, for example, compatible with thermal printers including direct thermal and thermal-transfer printers (i.e., barcode printers), inkjet, LED, UV and laser printers. In some cases, thermochromic inks such as a leuco dye could be incorporated onto or in the label facestock and could darken when heated, which causes an image or information to be printed on the label facestock.

Therefore, in use, the self-laminating label assembly can be fed through a printer to print the required label, wording, data, indicia, barcode or image on the label facestock before the label is affixed to a surface to be labelled. The self-laminating label can then be released from the label support liner and affixed to the surface over the label facestock. The label can be affixed to a variety of different surfaces, including, plastic, wood, metal, paper, ceramic, glass, etc. For example, the self-laminating label can be used to label a container or an object, such as for example a microscope slide, a vial, a plate (e.g. a cell culture plate, a multi-well plate), a petri dish, a plastic bag such as a blood bag or infusion liquid containing bag, equipment part, a medical device, an electronic device or a component, food packaging, industrial equipment, piping, car parts or any surface, a sheet of paper or material, etc. Since the laminating facestock is made of a material that can be resistant to chemicals, solvents, liquids, etc., it prevents the label facestock and the ink from being damaged once affixed to the surface.

There exists on the market self-laminating label assemblies that provide each label with a section of the laminating facestock mounted to the label facestock. Such configuration of the label can help aligning the laminating facestock with the respective label facestock during the lamination process. It however presents some drawbacks.

For example, since the laminating facestocks are connected to the label facestocks, they are fed through the printer with the printable facestock during the printing process. Because the laminating facestocks tend to fold upwardly and away from the main liner and therefore do not remain in a horizontal configuration, superposed to the liner, not only the laminating facestocks, but also the whole self-laminating label assembly can be damaged. Efficiency of the printing process can also be reduced (e.g., the label assembly jams in the printer, the printing quality decreases, the printing time increases, information loss may occur, etc.). In some other instances, the labels are used for manual writing or they are commercially printed and need to be laminated and applied by the end user. In some instances, a date or lot number or other information is added by the end-user before laminating and applying. In those cases, the laminating portion is often causing inconvenience by bending towards the main label and interfering with writing or manipulating the label.

There is therefore a need for improved self-laminating label assemblies which, by virtue of their designs and components, would be able to overcome or at least minimize some of the challenges in the field.

SUMMARY

According to one aspect, there is provided a self-laminating label assembly comprising: a label support liner having a label receiving surface; and a self-laminating label releasably affixed to the label receiving surface and comprising: a label facestock having a facestock lower surface releasably affixed to the label receiving surface of the label support liner and a facestock upper surface; and a laminating facestock for laminating at least part of the label facestock, the laminating facestock having an external surface releasably affixable to the label support liner and a laminating surface affixable to the facestock upper surface, the laminating facestock being movable between a non-laminating configuration in which only a peripheral edge region of the laminating surface is affixed on the facestock upper surface and in which at least part of the external surface is releasably affixed to the label receiving surface of the label support liner, and a laminating configuration in which the laminating facestock is affixed to, and laminates, at least a section of the facestock upper surface of the label facestock.

In at least one embodiment, the self-laminating label assembly further comprises a laminating facestock holder affixed to the label receiving surface, the laminating facestock holder being positioned so as to releasably affix the laminating facestock to the label support liner when the laminating facestock is in the non-laminating configuration.

In at least one embodiment, the laminating facestock holder comprises a holder facestock having a holder facestock lower surface being affixed to the label receiving surface of the label support liner and a holder facestock upper surface, the external surface of the laminating facestock being releasably affixable to the holder facestock upper surface for holding the laminating facestock in the non-laminating configuration.

In at least one embodiment, the holder facestock lower surface of the holder facestock is coated with a holder facestock lower surface adhesive.

In at least one embodiment, the holder facestock upper surface of the holder facestock is coated with a holder facestock upper surface adhesive allowing the laminating facestock to be released from the holder facestock upper surface.

In at least one embodiment, the holder facestock upper surface of the holder facestock is coated with a static cling material allowing the laminating facestock to cling thereto.

In at least one embodiment, the laminating facestock holder is a static cling facestock having a static cling facestock lower surface being affixed to the label receiving surface of the label support liner and a static cling facestock upper surface, the external surface of the laminating facestock being stuck to the static cling facestock upper surface via static cling for holding the laminating facestock in the non-laminating configuration.

In at least one embodiment, the self-laminating label assembly of claim 8, wherein at least one or the label support liner is made of a static cling material such that when the laminating facestock is in the non-laminating configuration, at least part of the part of the external surface can releasably be stuck to the label support liner via static cling.

In at least one embodiment, the self-laminating label assembly of claim 9, wherein the support liner is made of the static cling material.

In at least one embodiment, the self-laminating label assembly of claim 9, wherein the laminating facestock is made of the static cling material.

In at least one embodiment, at least part of the label receiving surface of the label support liner is coated with a release coating.

In at least one embodiment, the label support liner comprises a first section and a second section, the label receiving surface of one of the first or second section being coated with the release coating.

In at least one embodiment, the self-laminating label is releasably affixed to the one of the first or second section that is coated with the release coating.

In at least one embodiment, an entirety of the label receiving surface of the label support liner is coated with a release coating.

In at least one embodiment, the facestock lower surface of the label facestock is coated with a label facestock adhesive allowing the label facestock to be released from the label receiving surface of the label support liner and affixed to a surface to be labelled.

In at least one embodiment, the laminating surface of the laminating facestock is coated with a laminating facestock adhesive allowing the laminating facestock to be affixed to the facestock upper surface of the label facestock.

In at least one embodiment, the laminating facestock is transparent.

In at least one embodiment, the laminating facestock is translucent.

In at least one embodiment, the laminating facestock is matte.

In at least one embodiment, the laminating facestock is glossy.

In at least one embodiment, the laminating facestock is hazy.

In at least one embodiment, the self-laminating label comprises a protective liner releasably affixed to the laminating surface for covering the laminating surface of the laminating facestock.

In at least one embodiment, the protective liner is releasably affixed to laminating surface via an adhesive surface that is at least part of the laminating surface of the laminating facestock.

In at least one embodiment, part of the label receiving surface is coated with a layer of an adhesive material, the external surface of the laminating facestock being releasably affixable thereto.

In at least one embodiment, the self-laminating label further comprises an intermediate support liner having a support liner lower surface being releasably affixed to the label receiving surface of the label support liner and a support liner upper surface being releasably affixed to the facestock lower surface of the label facestock.

In at least one embodiment, the self-laminating label assembly comprises a plurality of self-laminating labels being releasably affixable to the laminating facestock holder when configured in the non-laminating configuration.

In at least one embodiment, the self-laminating label assembly further comprises a plurality of corresponding laminating facestock holders, the self-laminating labels each being releasably affixable to a corresponding one of the laminating facestock holders when configured in the non-laminating configuration.

In at least one embodiment, the self-laminating label assembly further comprises at least one tear line separating adjacent ones of the plurality of self-laminating labels.

In at least one embodiment, the communication device includes at least one of a radio frequency identification (RFID) communication device, a near field communication (NFC) device and a wire-less communication device.

According to another aspect, there is also provided a method for laminating a label facestock of a self-laminating label releasably affixed to a label support liner, the self-laminating label including the label facestock and a laminating facestock comprising a peripheral edge region, the laminating facestock being mounted to the label facestock at the peripheral edge region, the label facestock including a facestock lower surface releasably affixed to a label receiving surface of the label support liner, the method comprising: providing the laminating facestock in a non-laminating configuration in which at least part of the laminating facestock is releasably affixed to the label receiving surface of the label support liner for holding the laminating facestock thereon; and moving the laminating facestock to a laminating configuration in which the laminating facestock is affixed to, and laminates, at least partially a facestock upper surface of the label facestock.

In at least one embodiment, the method further comprises releasing the label facestock from the label receiving surface of the label support liner.

In at least one embodiment, the method further comprises affixing the label facestock to a surface to be labelled.

BRIEF DESCRIPTION OF THE DRAWINGS

It will be understood that the drawings may not be entirely to scale. More specifically, the thickness of the components shown may be magnified in some or all Figures to allow the features of the different components to be more readily seen and appreciated.

DETAILED DESCRIPTION

Self-laminating label assemblies, self-laminating labels and methods for laminating label facestocks are described herein. The self-laminating label assemblies described herein can include a label support liner and one or more self-laminating label(s) releasably affixed to the label support liner. Each self-laminating label can include a label facestock releasably affixed to the label support liner and a laminating facestock which is shaped, sized and configured so as to laminate the label facestock, at least partially. In one scenario, the label facestock can be a printable label facestock, and can be, for example, compatible with thermal-transfer, direct-thermal, inkjet, laser, LED, flexographic, offset, screen-printing, UV printing, and impact printers. The laminating facestock can be affixable (releasably affixable in some scenarios) to the label support liner, directly or indirectly, as it will be described in more details below, and can be provided between a non-laminating configuration, where at least part of the laminating facestock is releasably affixed to the label support liner for holding the laminating facestock thereon or thereabout, and a laminating configuration, where the laminating facestock is affixed to, and laminates, the label facestock, at least partially. The self-laminating label assembly can optionally include a laminating facestock holder, or alternatively, a plurality of laminating facestock holders, affixed, or releasably affixed, to the label support liner so that the laminating facestock(s) can be releasably affixed to the laminating facestock holder(s) instead of directly to a label receiving surface of the label support liner.

Allowing the laminating facestock(s) to be configured in the non-laminating configuration(s), where the laminating facestock(s) is/are releasably affixed to the label support liner, or alternatively, to the laminating facestock holder(s), can improve the printing process. Instead of feeding the printer with the laminating facestock(s) of the self-laminating label(s) being in a configuration between the non-laminating configuration and the laminating configuration (e.g., in a substantially vertical orientation), which can damage not only the laminating facestock(s), but also the whole self-laminating label assembly, the printer can be fed with the laminating facestock(s) being releasably affixed to the label support liner, or alternatively, to the laminating facestock holder(s), which can increase the efficiency of the printing process (e.g., reduced number of printer jams, increased printing quality, reduced printing time, etc.). The self-laminating label assemblies described herein can also help a user to hand write on the label facestock prior it is laminated, as the laminating facestock can be maintained in the non-laminating configuration, away from the user's hand, for example. Once the required label or wording is printed or added on the label facestock(s), it/they can be laminated, by providing the laminating facestock(s) in the laminating configuration(s), where the laminating facestock(s) is/are affixed to and cover(s) the label facestock(s). The self-laminating label(s) can thus be released from the label support liner and affixed to a surface that needs to be labelled. For example, the self-laminating label(s) can be affixed to a variety of different surfaces, including, without limitations, plastic, wood, metal, paper, ceramic, glass, and the like. In one scenario, the self-laminating label(s) can be used to label a microscope slide, tube, a vial, a tube or vial box, a tube or vial cap, a frozen surface, a microplate, a dish, an IVF straw, a PCR tube, a metal rack, cryo storage canes, a sheet of paper, and the like. These labels can be used in any industry and for any application including, but not limited to, electrical, electronic, aerospace, automotive, gas and oil, construction, inventory management, or any other relevant application or industry. These labels can be used for the identification of electronic parts and equipment, wiring, equipment that needs cleaning and disinfection, secure identification and/or inventory of tools, devices, objects and products. In some embodiments, the label facestock may comprise any coating, ink, thermochromic ink, radio frequency identification (RFID) communication device, near field communication (NFC) tag or device or wireless communication device or an electronic component. The laminating facestock(s), and thus the self-laminating label(s), can also be resistant to chemicals, solvents, liquids, and all kind of other exposures that can damage the label facestock(s), as it will be described in more details below. The laminating facestock(s) can be transparent or translucent to allow the user to see the label, wording or image provided on the label facestock, or to scan a barcode provided on the label facestock. The laminating facestock(s) could also be matte, gloss, hazy, with any degree of transparency or translucency, and may have some color shade while still being transparent or translucent. The self-laminating labels described here can thus be used as solvent and chemical resistant labels, stain-resistant labels such as for use in histological staining protocols in histology and cytology, cryogenic labels, deep-freeze labels, autoclave-resistant labels, healthcare labels, general use labels, and the like.

Referring to FIGS. 1 and 3 to 6, there is schematically illustrated a self-laminating label assembly (10), in accordance with one embodiment. The self-laminating label assembly (10) includes a label support liner (100) and a plurality of self-laminating labels (200) releasably affixed to the label support liner (100).

Figure 2:
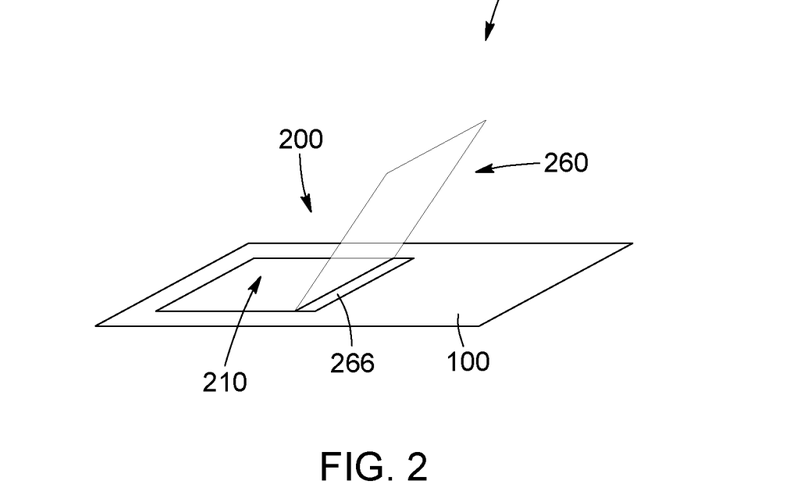
FIG. 2 is a top perspective view of a self-laminating label assembly, in accordance with another embodiment, in which the assembly comprises a single self-laminating label affixed to a label support liner.

Turning to FIG. 2, it is noted that in other embodiments, instead of including a plurality of self-laminating labels (200), the assembly (10) can include only one self-laminating label (200). The self-laminating label(s) can take any shape, size or configuration on the label support liner (100).

Referring back to FIGS. 1 and 3 to 6, the label support liner (100) has a label receiving surface (102), and the self-laminating label (200) is releasably affixed to the label receiving surface (102). Each self-laminating label (200) includes a label facestock (210), which has a facestock lower surface (212) releasably affixed to the label receiving surface (102) of the label support liner (100) and a facestock upper surface (214). Each self-laminating label (200) further includes a laminating facestock (260), which has a laminating surface (262) which is affixable to the facestock upper surface (214) and which is shaped, sized and configured so as to at least partially laminate the label facestock (210). The laminating surface (262) includes a peripheral edge region (266) which is affixed at a corresponding location on the facestock upper surface (214). The laminating surface (262) is therefore mounted to the label facestock (210) at the peripheral edge region (266). In the illustrated embodiment, the peripheral edge region (266) is affixed to a corresponding peripheral portion of the facestock upper surface (214), as shown in FIG. 3, but alternatively, the peripheral edge region (266) could be affixed at another location on the facestock upper surface (214).

The laminating facestock (260) further has an external surface (264), which is releasably affixable to the label support liner (100), directly or indirectly. The laminating facestock (260) may be configured to be resistant to various exposures such as chemicals, solvents, liquids, physical friction and/or all kind of other exposures.

Figure 1:
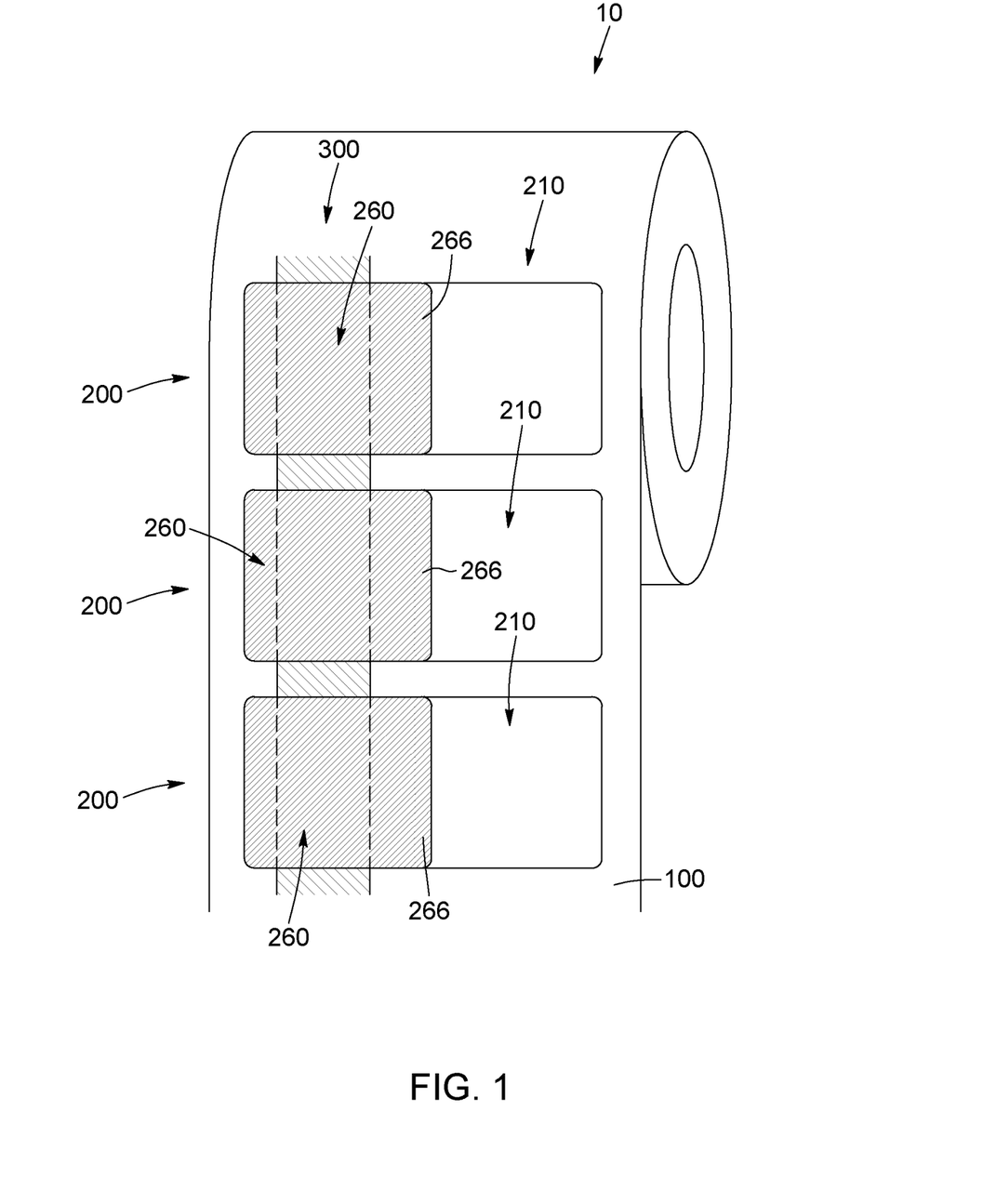
FIG. 1 is a top plan view of a self-laminating label assembly, in accordance with an embodiment, in which the assembly comprises a plurality of self-laminating labels affixed to a label support liner.
Figure 3:
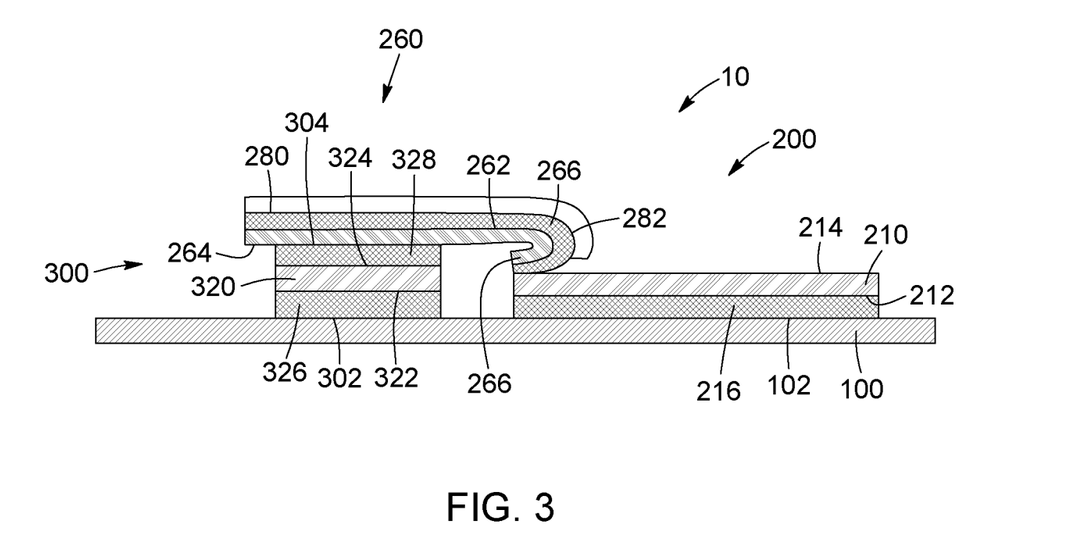
FIG. 3 is a side elevation view of the self-laminating label assembly illustrated in FIG. 3, with the laminating facestock of the self-laminating label configured in a non-laminating configuration in which the laminating facestock is releasably affixed to the laminating facestock holder.
Figure 6:
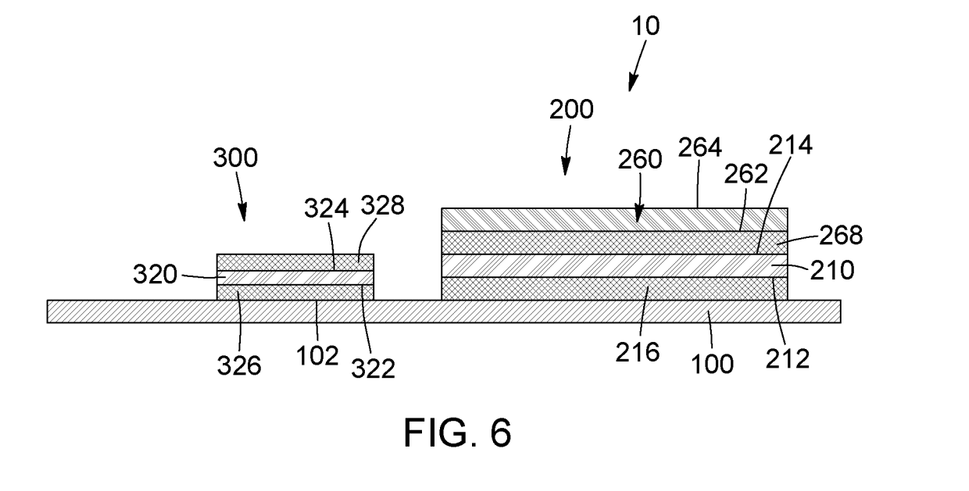
FIG. 6 is a side elevation view of the self-laminating label assembly of FIG. 3, with the laminating facestock of the self-laminating label configured in the laminating configuration in which the laminating facestock is affixed to the label facestock.

Still referring to FIGS. 1 and 3 to 6, the laminating facestock (260) is movable between a non-laminating configuration, illustrated in FIGS. 1 and 3, where the laminating facestock (260) is bent or folded rearwardly such that at least part of the external surface (264) of the laminating facestock (260) is releasably maintained on the label receiving surface (102) while only the peripheral edge region (266) is affixed on the label facestock (210), and a laminating configuration, illustrated in FIG. 6, where the laminating facestock (260) extends over the label facestock (210) and is affixed to, and at least partially laminates, the facestock upper surface (214) of the label facestock (210). It will be understood that when the laminating facestock (260) is moved from the non-laminating configuration to the laminating configuration, the peripheral edge region (266) remains affixed to the label facestock (210) and does not move relative to the label facestock (210). This prevents the laminating facestock (260) from being misaligned with the label facestock (210) as it is moved from the non-laminating configuration to the laminating configuration.

It will be understood that although the laminating facestock (260) is shown in FIG. 3 and in following Figures as substantially curved near the peripheral edge region (266) when the laminating facestock (260) is in the non-laminating configuration, in practice, the laminating facestock (260) could instead be bent at a relatively sharp angle and even create a 180-fold in which the laminating facestock (260) is fully parallel to the label receiving surface (102) of the label support liner (100). In one embodiment, the laminating facestock (260) could also have a weakened material line (for example a perforated line or a pre-made crease line) delimiting the peripheral edge region (266) from the rest of the laminating facestock (260) to promote the folding and positioning of the laminating facestock (260), and therefore of the entire self-laminating label (200), in a flat configuration against the label support liner (100).

In some scenarios, once the laminating facestock (260) is placed in the laminating configuration and is therefore applied to the label facestock (210), the laminating facestock (260) remains permanently affixed to the label facestock (210). In other scenarios, the laminating facestock (260) can be releasably affixed to the label facestock (210) to allow the laminating facestock (260) to be removed from the label facestock (210) if desired. In this case, the laminating facestock (260) may be slightly larger than the label facestock (210) to allow a user to easily grip the laminating facestock (260) to unseal the laminating facestock (260) from the label facestock (210) after the laminating facestock (260) has been laminated over the label facestock (210).

In the embodiment illustrated in FIGS. 1 and 3 to 6, instead of the laminating facestock (260) being releasably affixed directly to the label support liner (100), the self-laminating label assembly (10) includes a laminating facestock holder (300) via which the laminating facestock (260) is releasably affixed to the label support liner (100). Specifically, the laminating facestock holder (300) has a liner surface (302) affixed to the label receiving surface (102) and a holding surface (304) opposite the liner surface (302). In this embodiment, when the laminating facestock (260) is configured in the non-laminating configuration, at least part of the external surface (264) of the laminating facestock (260) is releasably affixed to the holding surface (304) of the laminating facestock holder (300). It is noted that in one scenario, the self-laminating label assembly (10) can include a plurality of laminating facestock holders (300). In this case, each laminating facestock (260) can be affixable to a corresponding one of the laminating facestock holders (300) when configured in the non-laminating configuration. In one embodiment, the laminating facestock holder (300) may extend over an entirety of an area between an edge of the label support liner (100) and the self-laminating labels (200). Alternatively, the laminating facestock holder (300) may extend over a smaller surface of the label support liner (100).

As best shown in FIGS. 3 to 6, the label receiving surface (102) of the label support liner (100) can be coated with a release coating, while the facestock lower surface (212) of the label facestock (210) can be coated with a label facestock adhesive (216), thereby allowing the label facestock (210) to be easily released from the label receiving surface (102) of the label support liner (100) and affixed to a surface that needs to be labelled thereafter. The laminating surface (262) of the laminating facestock (260) can be coated with a laminating facestock adhesive (268) allowing the laminating facestock (260) to be affixed to the facestock upper surface (214) of the label facestock (210). In one embodiment, the laminating facestock adhesive (268) can be such that once the laminating facestock (260) is affixed to the facestock upper surface (214) of the label facestock (210) for lamination, it cannot be released and re-affixed. However, in another scenario, the laminating facestock adhesive (268) that covers the laminating surface (262) can allow the laminating surface (262) to further be relatively readily removable from the facestock upper surface (214) of the label facestock (210).

In one scenario, the label support liner (100) can be a release liner and more particularly, a paper or plastic-based film sheet or roll used to prevent a sticky surface to prematurely adhering. The liner (100) can be coated on one or both surface(s) with a release agent such as a silicone, fluorosilicone, or the like, which can provide a release effect against the sticky material, the label facestock adhesive (216) for example. In one embodiment, the liner (100) can be a sheet or roll of paper (e.g., Kraft paper, supercalendered Kraft paper, glassine, clay coated Kraft paper, coated paper, machine finished Kraft paper, machine glazed paper, etc.) or a plastic film such as a thermoplastic film (e.g., a polyethylene terephthalate (PET) film, a polypropylene (PP) film, an oriented polypropylene film such as a biaxially oriented polypropylene (BOPP) film, a polyolefin film, or other thermoplastic or polymer comprising material, etc.), while the release coating can include, as mentioned above, silicone (e.g., crosslinkable silicone, fluorosilicone, etc.), or any material that has a low surface energy such as, for example, fluorochemicals, waxes, paraffins, water-based release coatings, oil-based release coatings, solvent-based release coatings, biodegradable release coatings, phosphate ester-based release coatings, etc.). Similarly, the label facestock (210) can be a paper or plastic-based film such as thermoplastic film or any polymer comprising film provided as a roll or sheet, while the label facestock adhesive (216) can be any type of adhesive including pressure-sensitive adhesives, and non-limitative examples include a permanent adhesive, a removable adhesive, a repositionable adhesive, such as a water-based acrylic, an emulsion adhesive, a hot melt adhesive, a UV hotmelt adhesive, a rubber-based adhesive, a heat activated adhesive, a latex-based adhesive, a solvent-based adhesive, a silicon-based adhesive, a UV-curable adhesive, a LED-curable adhesive, etc. All those adhesives are commonly used in label material manufacturing and the label (200) comprising such adhesives can be removed from the liner (100). On the other hand, the laminating facestock (260) can be a polymer-based film roll or sheet and can be made from a wide variety of transparent or translucent polymeric films such as of a flexible vinyl film including Polyvinyl Chloride (PVC) and Polyvinyl Fluoride (PVF), a polyethylene terephthalate (PET), Biaxially Oriented Polypropylene (BOPP), Polypropylene (PP), oriented polypropylene, Polyethylene (PE), Polyolefin, Polysterene, acrylate, nylon, static cling films, silicone rubber, polyimide, composite materials resulting from plastic extrusion process, blown films, and the like, being coated with a pressure sensitive adhesive. In some scenarios, the laminating facestock can also be opaque. In one scenario, the laminating facestock adhesive (268) can be permanent, while in another scenario, the laminating facestock adhesive (268) can be removable, allowing repositioning of the facestock. The laminating facestock (260) can therefore be repositionable on the label facestock (210). The laminating facestock adhesive (268) can be, for example, a water-based acrylic, an emulsion adhesive, a hot melt adhesive, a UV hotmelt adhesive, a rubber-based adhesive, a latex-based adhesive, a solvent-based adhesive, a silicon-based adhesive, a UV-curable adhesive, a LED-curable adhesive, a heat-activated adhesive, etc. Similarly, in one scenario, the label facestock adhesive (216) can be permanent, while in another scenario, the label facestock adhesive (216) can be removable, allowing repositioning of the label (200) on the surface to be labelled. Both adhesives (216, 268) can also be glove-friendly removable adhesives, for example. It is noted that any pressure-sensitive adhesive could be used.

In the embodiment illustrated in FIG. 3, the laminating facestock adhesive (268) covers substantially the totality of the laminating surface (262), including the peripheral edge region (266), to allow the laminating facestock (260) to be mounted or affixed to the label facestock (210) at the peripheral edge region (266) via the adhesive (268) provided thereon. Alternatively, the laminating facestock adhesive (268) could cover only a portion of the laminating surface (262), which may or may not include the peripheral edge region (266). In embodiments in which the peripheral edge region (266) is not provided with adhesive (268), the peripheral edge region (266) could instead be affixed to the label facestock (210) using other suitable affixing technique.

Still referring to the embodiment of FIGS. 3 to 6, in one scenario, the self-laminating label (200) can further include a protective liner (280) which has a label-facing surface (282) releasably affixed to the laminating surface (262) of the laminating facestock (260) for at least partially covering the laminating surface (262) of the laminating facestock (260). More specifically, the protective liner (280) is configured for covering the laminating facestock adhesive (268) on the laminating surface (262) of the laminating facestock (260). This may prevent the laminating facestock adhesive (268) to undesirably become stuck to surfaces or to the user's fingers or gloves as the self-laminating label (200) is manipulated. The laminating facestock adhesive (268) can be removed from the laminating surface (262) when the laminating facestock (260) is in the non-laminating configuration, just prior to the laminating facestock (260) being moved towards the label facestock (210) to be positioned in the laminating configuration over the label facestock (210).

In one embodiment, the protective liner (280) can be a paper or plastic-based film sheet or roll having a composition which enables the protective liner (280) to be releasably affixable to the laminating facestock adhesive (268). For example, the liner (280) can be coated with a release agent, as described above, or could have any other suitable composition.

In the illustrated embodiment, the protective liner (280) is sized and shaped such that the label-facing surface (282) covers only part of the laminating surface (262) of the laminating facestock (260), so that only a section of the laminating surface (262) is protected by the protective liner (280). Specifically, the protective liner (280) covers the entire laminating surface (262) except the peripheral edge region (266). Alternatively, the protective liner (280) could cover the entire laminating surface (262) including the peripheral edge region (266).

Referring back to the embodiment of FIGS. 3 to 6, the laminating facestock holder (300) can include a holder facestock (320), which has a holder facestock lower surface (322) affixed to the label receiving surface (102) of the label support liner (100) and a holder facestock upper surface (324) releasably affixable to the external surface (264) of the laminating facestock (260) for holding the laminating facestock (260) in the non-laminating configuration, as shown in FIG. 3. While the holder facestock lower surface (322) can be coated with a holder facestock lower surface adhesive (326), the holder facestock upper surface (324) can be coated with a holder facestock upper surface adhesive (328)

that allows the laminating facestock (260) to be easily released from the holder facestock upper surface (214) so as to be affixed to the label facestock (210), while the holder facestock (320) remains affixed to the label support liner (100).

For example, the holder facestock (320) can have a composition similar to the composition of the label facestock or can alternatively be made of any appropriate material, including a paper, a polymer film, a thermoplastic film, a silicone rubber, non-woven tissue or a composite material. In one scenario, the holder facestock lower surface adhesive (326) can have a composition similar to the composition of the label facestock adhesive (216). The holder facestock (320) can be securely affixed to the label support liner (100) (i.e., permanently), or alternatively, can be releasably affixed thereto (i.e., removably). On the other hand, the holder facestock upper surface adhesive (328) can have a composition similar to the composition of the laminating facestock adhesive (268) or can alternatively be made of coating or varnish that has affinity to the laminating facestock and that can maintain a low-level adhesion without classifying as an adhesive. For example, instead of having a holder facestock upper surface adhesive, the holder facestock (320) could be configured to project a static cling force which would allow the laminating facestock (260) to be releasably affixed to the holder facestock (320). Alternatively, the holder facestock could have any other suitable configuration which would allow it to easily be released from the laminating facestock holder (300) and moved towards the laminating configuration. A combination of the static cling force with an affinity coating or adhesive is also contemplated.

In some embodiments, the self-laminating label (200) could further include one or more communication devices such as a radio frequency identification (RFID) communication device, a near filed communication (NFC) device or a wireless communication device which could be located between the label facestock (210) and the label facestock adhesive (216) or could be provided beyond or beneath the label facestock adhesive (216) and be provided with its own adhesive for affixing to the label support liner (100).

Figure 7:
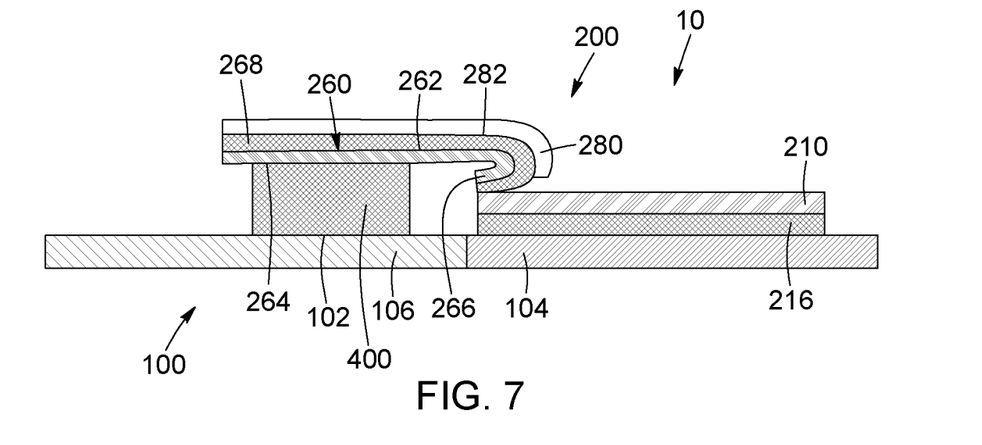
FIG. 7 is a side elevation view of a self-laminating label assembly in accordance with yet another embodiment, with the laminating facestock of the self-laminating label configured in the non-laminating configuration.
Figure 8:
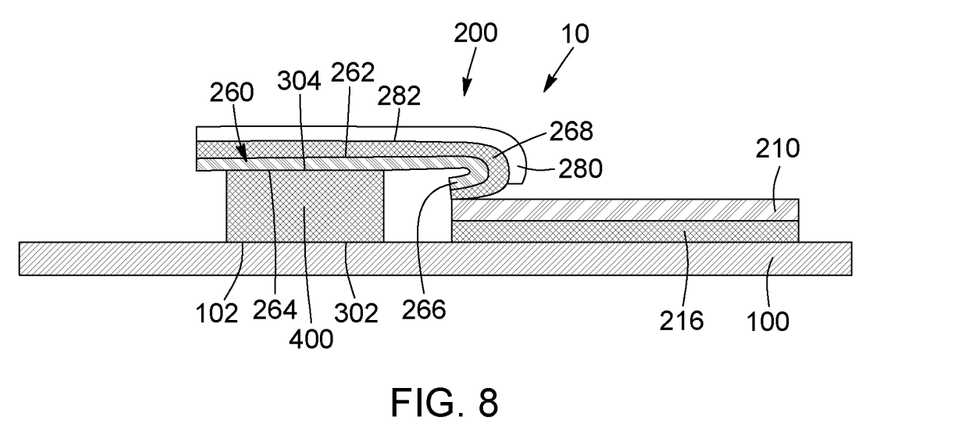
FIG. 8 is a side elevation view of a self-laminating label assembly in accordance with another embodiment, the laminating facestock of the self-laminating label being configured in a non-laminating configuration, releasably affixed to the label support liner.

Now referring more particularly to FIGS. 2, 7 and 8, instead of being affixed to the label support liner (100) via a holder such as the laminating facestock holder (300) of FIGS. 1 and 3 to 6, the external surface (264) of the laminating facestock (260) could be releasably affixable directly to the adhesive material (400) by a layer of an adhesive material (400) applied over a section of the label receiving surface (102) of the label support liner (100). In one scenario, the release coating provided on the label receiving surface (102) may not be applied at the area where the adhesive (400) is located on support liner (100) such that the adhesive (400) is not releasable from the support liner (100) in order to remain on the label receiving surface (102) when the laminating facestock (260) is pulled away from the label receiving surface (102).

Figure 9:
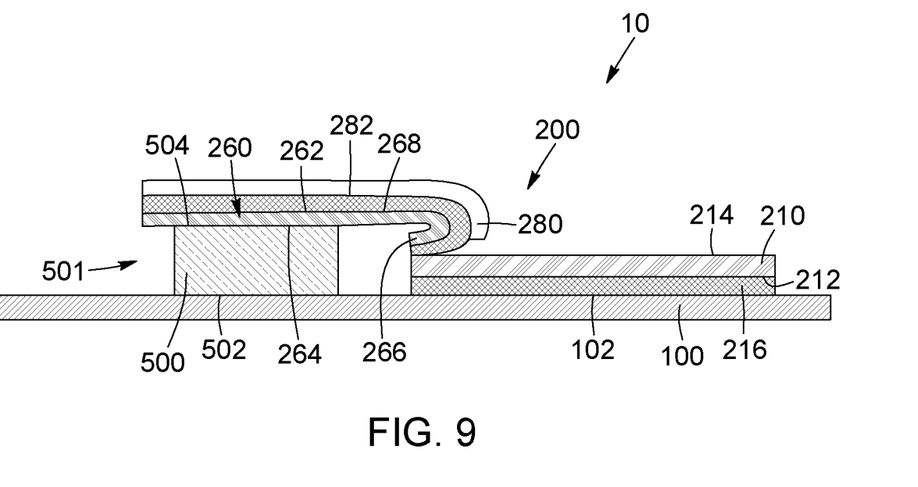
FIG. 9 is a side elevation view of a self-laminating label assembly in accordance with a further embodiment, the laminating facestock of the self-laminating label being configured in a non-laminating configuration, releasably affixed to the laminating facestock holder.

Turning now to FIG. 9, there is shown an embodiment which includes a laminating facestock holder (501) which takes the form of a static cling facestock (500), which has a static cling facestock lower surface (502) affixed to the label receiving surface (102) of the label support liner (100), as well as a static cling facestock upper surface (504). The static cling facestock (500) can have a composition allowing the external surface (264) of the laminating facestock (260) to be releasably stuck to the static cling facestock upper surface (504) for holding the laminating facestock (260) in the non-laminating configuration. For example, the static cling facestock (500) can be made of vinyl, including Polyvinyl Chloride (PVC), BOPP, PET or any other polymer film having a static cling surface, etc.

Figure 10:
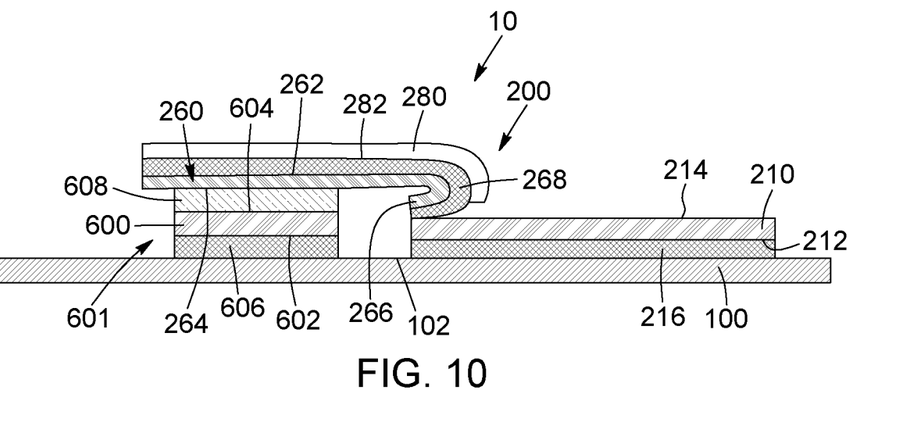
FIG. 10 is a side elevation view of a self-laminating label assembly in accordance with yet another embodiment, the laminating facestock of the self-laminating label being configured in a non-laminating configuration, releasably affixed to the laminating facestock holder.

Referring now to FIG. 10, there is shown another embodiment which comprises a laminating facestock holder (601) including a holder facestock (600) which has a holder facestock lower surface (602) affixed to the label receiving surface (102) of the label support liner (100), as well as a holder facestock upper surface (604). The holder facestock upper surface (604) can be coated so as to allow the external surface (264) of the laminating facestock (260) to be releasably stocked to the holder facestock upper surface (604) by static cling force for holding the laminating facestock (260) in the non-laminating configuration. Indeed, while the holder facestock lower surface (602) can be coated with a holder facestock adhesive (606), as described above, the holder facestock upper surface (604), on the other hand, can be coated with a static cling material (608), allowing the laminating facestock (260) to cling to the holder facestock upper surface (604) of the holder facestock (600) via static cling force. For example, the static cling material can include vinyl, Polyvinyl Chloride (PVC), BOPP, PET or any other polymer film having a static cling surface.

Figure 11:
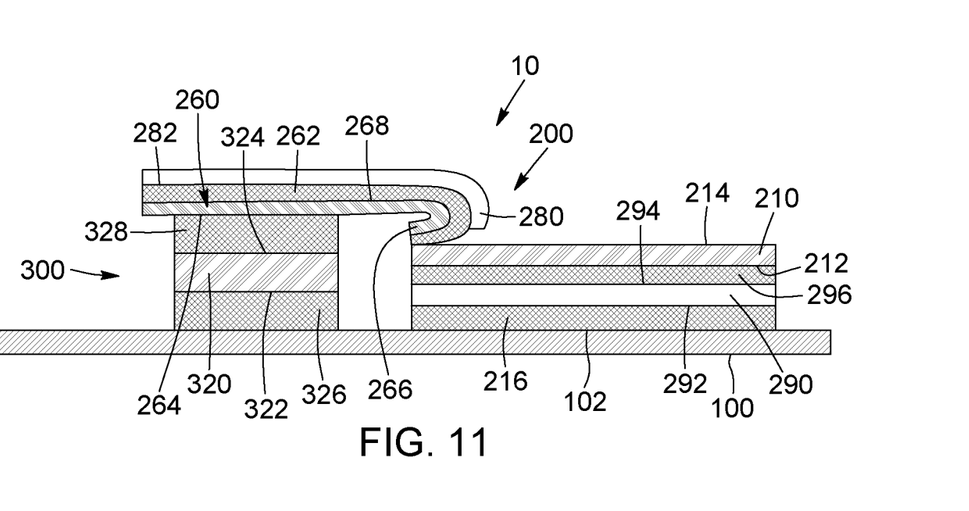
FIG. 11 is a side elevation view of a self-laminating label assembly in accordance with another embodiment, the laminating facestock of the self-laminating label being configured in a non-laminating configuration, releasably affixed to the laminating facestock holder.

FIG. 11 shows another embodiment in which the self-laminating label (200) further includes an intermediate support liner (290), which has a support liner lower surface (292) releasably affixed to the label receiving surface (102) of the label support liner (100) via the label facestock adhesive (216), and a support liner upper surface (294), releasably affixed to the facestock lower surface (212) of the label facestock (210) via a support liner adhesive (296). This piggy-back construction can allow the label facestock (210) to be laminated and then removed from the support liner (100) with the intermediate support liner (290) and with at least part of the support liner adhesive (296) remaining on the intermediate support liner (290). The label (200) can thus be affixed to a container or surface through the support liner adhesive (296) on the intermediate support liner (290). The laminated label facestock (210) can then subsequently be removed and transferred to another container or surface or record book and attached through the label facestock adhesive (216). As mentioned above, in some scenarios, the support liner (100) may not include a release coating or the release coating may not be provided in the area where the support liner adhesive (296) is located, so that the intermediate support liner (290) and the support liner adhesive (296) are non-releasably, i.e. permanently, attached to the support liner (100). In this case, this configuration provides a stronger and permanent adhesion of the support liner adhesive (296) to the support liner (100) to reduce the risk that the self-laminating label (200) be accidentally released from the liner (100).

Figure 12:
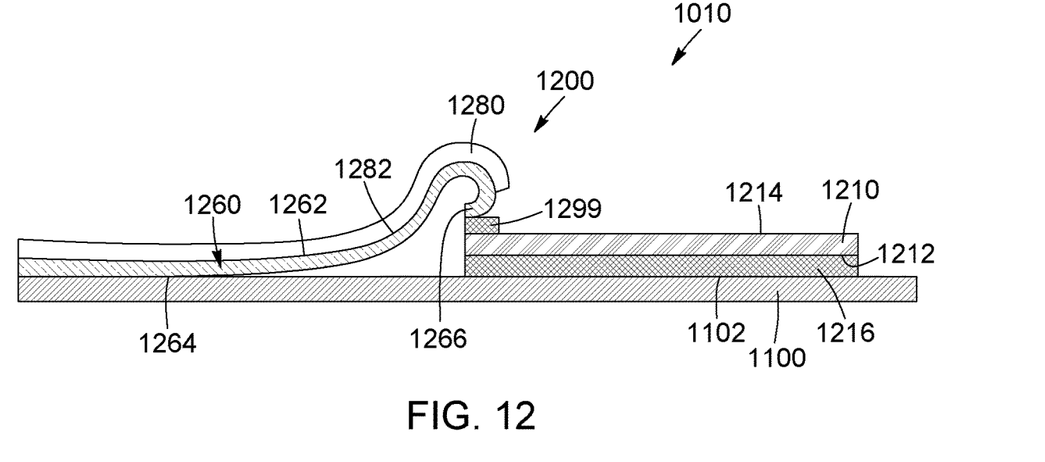
FIG. 12 is a side elevation view of a self-laminating label assembly in accordance with another embodiment, in which the laminating facestock of the self-laminating label is releasably affixed to the label support liner by static cling force and is affixable to the label facestock also by static cling force.

Now referring to FIG. 12, there is schematically illustrated a self-laminating label assembly (1010), in accordance with another embodiment. The self-laminating label assembly (1010) includes a label support liner (1100), which has a label receiving surface (1102), and at least one self-laminating label(s) (1200) which is/are releasably affixed to the label receiving surface (1102). Each self-laminating label (1200) includes a label facestock (1210), which has a facestock lower surface (1212) releasably affixed to the label receiving surface (1102) of the label support liner (1100), and a facestock upper surface (1214). Each self-laminating label (1200) further includes a laminating facestock (1260), which has a laminating surface (1262) which is affixable to (or releasably affixable to) the facestock upper surface (1214) and which is shaped, sized and configured so as to at least partially laminate the label facestock (1210). The laminating surface (1262) includes a peripheral edge region (1266) via which the laminating facestock (1260) is mounted to the label facestock (1210).

The laminating facestock (1260) further has an external surface (1264) releasably affixable to the label support liner (1100). In the embodiment illustrated in FIG. 12, the peripheral edge region (1266) is affixed to the label facestock (1210) via an adhesive band (1299) which extends between the label facestock (1210) and the laminating facestock (1260), but alternatively, the peripheral edge region (1266) could be affixed to the label facestock (1210) using another suitable affixing technique. In this embodiment, the laminating facestock (1260) is made of a static cling material such that when the laminating facestock (1260) is in the non-laminating configuration, at least part of the external surface (1264) can releasably be stuck to the label support liner (1100) via static cling force and when the laminating facestock (1260) is in the laminating configuration, the laminating surface (1262) can be at least partially stuck to and laminate the facestock upper surface (1214), again via static cling force. It will therefore be appreciated that in this embodiment, no adhesive is required to hold the laminating facestock (1260) in either the non-laminating configuration or the laminating configuration.

Figure 13:
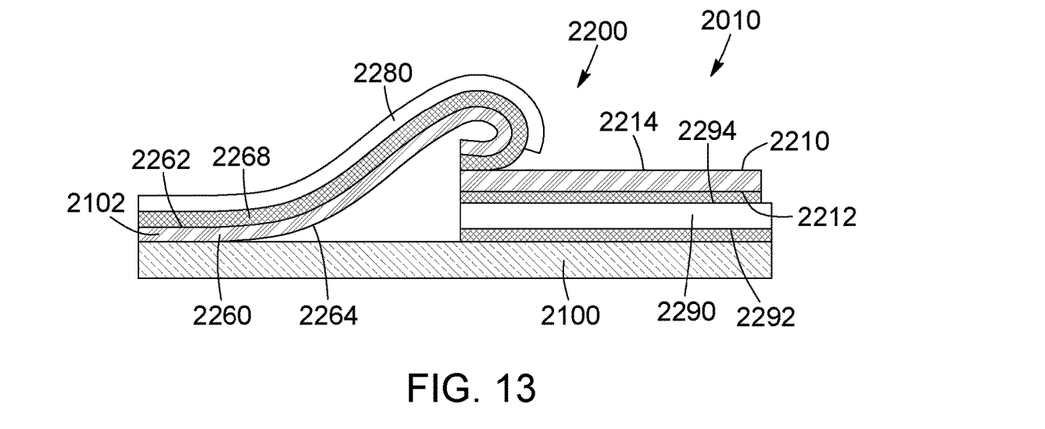
FIG. 13 is a side elevation view of a self-laminating label assembly in accordance with another embodiment, in which the laminating facestock of the self-laminating label is releasably affixed to the label support liner by static cling force and is affixable to the label facestock via a laminating facestock adhesive, and in which the self-laminating label has as piggy-back configuration.

Turning to FIG. 13, there is shown a self-laminating label assembly (2010), in accordance with another embodiment. In this embodiment, the assembly (2010) includes a label support liner (2100), which has a label receiving surface (2102), and at least one self-laminating label(s) (2200) which is/are releasably affixed to the label receiving surface (2102).

Each self-laminating label (2200) includes a label facestock (2210), which has a facestock lower surface (2212) and a facestock upper surface (2214). In the embodiment illustrated in FIG. 13, the self-laminating label (200) has a piggy-back configuration and includes an intermediate support liner (2290) similar to the intermediate support liner (290) illustrated in FIG. 11. The intermediate support liner (2290) has a support liner lower surface (2292) releasably affixed to the label receiving surface (2102) of the label support liner (2100), and a support liner upper surface (2294) to which the facestock lower surface (2212) of the label facestock (2210) is releasably affixed. Alternatively, the self-laminating label (2200) may not have a piggy-back configuration and the facestock lower surface (2212) may instead be directly affixed to the label receiving surface (2102).

Each self-laminating label (2200) further includes a laminating facestock (2260), which has a laminating surface (2262) which is affixable to (or releasably affixable to) the facestock upper surface (2214) and which is shaped, sized and configured so as to at least partially laminate the label facestock (2210). The laminating surface (2262) includes a peripheral edge region (2266) via which the laminating facestock (2260) is mounted to the label facestock (2210).

The laminating facestock (2260) further has an external surface (2264) releasably affixable to the label support liner (2100). In the embodiment illustrated in FIG. 13, the external surface (2264) of the laminating facestock (2260) is not affixed to the label support liner (2100) via adhesive. Instead, the label support liner (2100) is made from a static cling material—such as vinyl, Polyvinyl Chloride (PVC), BOPP, PET or any other polymer film having static cling surface—and the external surface (2264) of the laminating facestock (2260) is releasably affixed to the label receiving surface (2102) via static cling force to hold the laminating facestock (2260) in the non-laminating configuration. Alternatively, instead of the label support liner (2100) being made of a static cling material, the label receiving surface (2102) could simply be at least partially coated with a static cling material. In another embodiment, instead of the label support liner (2100) being made from a static cling material or being coated with a static cling material, the laminating facestock (2260) could be made from or coated with a static cling material. In this embodiment, the label support liner (2100) may not be made of static cling material, and instead being made of non-static cling material which may further be provided with a release coating. In another embodiment, the self-laminating label assembly (2010) could include a "hybrid" support liner including a first portion made of a static cling material, to which the laminating facestock (2260) may be releasably affixed, and a second portion made of non-static cling material. In yet another embodiment, both the label support liner (2100) and the laminating facestock (2260) may be made from a static cling material.

In the embodiment illustrated in FIG. 13, the self-laminating label (2200) further includes a protective liner (2280), similar to the protective liner (280) illustrated in FIGS. 3 to 6, which has an adhesive surface (2282) releasably affixed to the laminating surface (2262) via a laminating facestock adhesive (2268) for at least partially covering the laminating surface (2262) of the laminating facestock (2260). In this embodiment, the protective liner (2280) is removed prior to moving the laminating facestock (2260) from the non-laminating configuration to the laminating configuration. Alternatively, the self-laminating label (2200) may not include a protective liner (2280).

Figure 14:
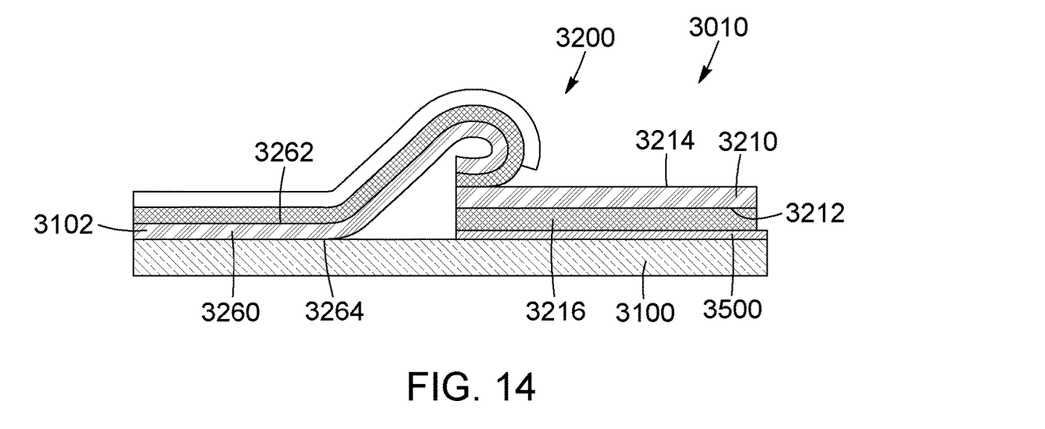
FIG. 14 is a side elevation view of a self-laminating label assembly in accordance with yet another embodiment, in which the laminating facestock of the self-laminating label is releasably affixed to the label support liner by static cling force and is affixable to the label facestock via a laminating facestock adhesive, and in which the self-laminating label via a label facestock adhesive.

Referring now to FIG. 14, there is shown a self-laminating label assembly (3010), in accordance with yet another embodiment. In this embodiment, the assembly (3010) includes a label support liner (3100), which has a label receiving surface (3102), and at least one self-laminating label(s) (3200) which is/are releasably affixed to the label receiving surface (3102).

Each self-laminating label (3200) includes a label facestock (3210) which has a facestock lower surface (3212) and a facestock upper surface (3214). In this embodiment, instead of being configured in a piggy-back configuration, the label receiving surface (3102) is provided with a release coating (3500), similar to the release coatings described above, and the facestock lower surface (3212) is releasably affixed to the label receiving surface (3102) via a label facestock adhesive (3216).

Each self-laminating label (3200) further includes a laminating facestock (3260) having a laminating surface (3262) and an external surface (3264). The laminating facestock (3260) is substantially similar to the laminating facestock (2260) illustrated in FIG. 13. Specifically, in this embodiment, the label support liner (3100) is made of a static cling material or a material having a static cling surface—such as vinyl, Polyvinyl Chloride (PVC), BOPP, PET or any other polymer film having static cling surface—and the external surface (3264) of the laminating facestock (3260) is releasably affixed to the label receiving surface (3102) via static cling force to hold the laminating facestock (3260) in the non-laminating configuration. Alternatively, instead of the label support liner (3100) being made of a static cling material, the label receiving surface (3102) could simply be at least partially coated with a static cling material. Alternatively, the label support liner (3100) may not be made of static cling material, and instead being made of non-static cling material which may further be provided with a release coating. In another embodiment, the self-laminating label assembly (3010) could include a "hybrid" support liner including a first portion made of a static cling material, to which the laminating facestock (3260) may be releasably affixed, and a second portion made of non-static cling material. In yet another embodiment, both the label support liner (3100) and the laminating facestock (3260) may be made from a static cling material.

In some embodiments, only part of the label receiving surface (102) of the label support liner (100) can be coated with the release coating. For example, as shown in FIG. 7, the label support liner (100) can include a first section (104) and a second section (106). In one scenario, the label receiving surface (102) of the first section (104) can be coated with the release coating, while the second section (106) can remain uncoated. Thus, the self-laminating label(s) (200) can be releasably affixed to the first section (104), while, as mentioned above, the second section (106) can receive the adhesive material (400) which would remain affixed to the second section (106) when the laminating facestock (260) is moved from the non-laminating configuration to the laminating configuration. In some embodiments, the composition of the label facestock adhesive (216) could also be different from the composition of the adhesive material (400) (or the composition of the holder facestock lower surface adhesive (326)). It will be understood that although this configuration is shown in the embodiment illustrated in FIG. 7, any of the embodiments illustrated in FIGS. 1 to 14 could include a label support liner having multiple liner sections where at least one of the multiple liner sections is coated with a release coating and at least one of the other liner sections is uncoated.

The self-laminating label assemblies described herein can further include one or more tear line(s) separating adjacent ones of the plurality of self-laminating labels so the self-laminating label assembly can be detached in sections (e.g., a section of the main label support liner and one self-laminating label being releasably affixed thereto). Similarly, the self-laminating label assemblies described herein can also include one or more tear line(s) punched in a label facestock sheet or roll to delimit the plurality of label facestock(s) so as to help the user in releasing the self-laminating label(s) from the label support liner and label facestock sheet.

A method for laminating the label facestocks (210) of the self-laminating labels (200) of an assembly (10) will now be described, in accordance with one embodiment. In this embodiment, when the self-laminating label assembly (10) is initially provided, the facestock lower surfaces (212) of the label facestocks (210) are affixed to the label receiving surface (102) of the label support liner (100). At this stage, the laminating facestocks (260) can be configured in their non-laminating configurations, where they are releasably maintained about the label receiving surface (102) of the label support liner (100). The laminating facestocks (260) can thus be maintained down and substantially parallel to the label support liner (100), which facilitates the passage of the self-laminating label assembly (10) through the printer. In an embodiment in which the assembly (10) includes one or more laminating facestock holder (300), the laminating facestocks (260) are instead affixed to the holding surface (304) of the laminating facestock holder(s) (300), for holding the laminating facestock (260) such that it remains folded and substantially parallel to the label support liner (100), as shown in FIG. 3, when it passes through the printer.

Once the assembly (10) has been fed through the printer and the required label or wording has been printed or added on the label facestocks (210), the label facestocks (210) can be laminated, by moving the laminating facestock (260) from the non-laminating configuration to the laminating configuration, in which the laminating facestocks (260) can be affixed to and cover at least a section of the facestock upper surfaces (214) of the label facestocks (210), as shown for example in FIG. 6.

Figure 4:
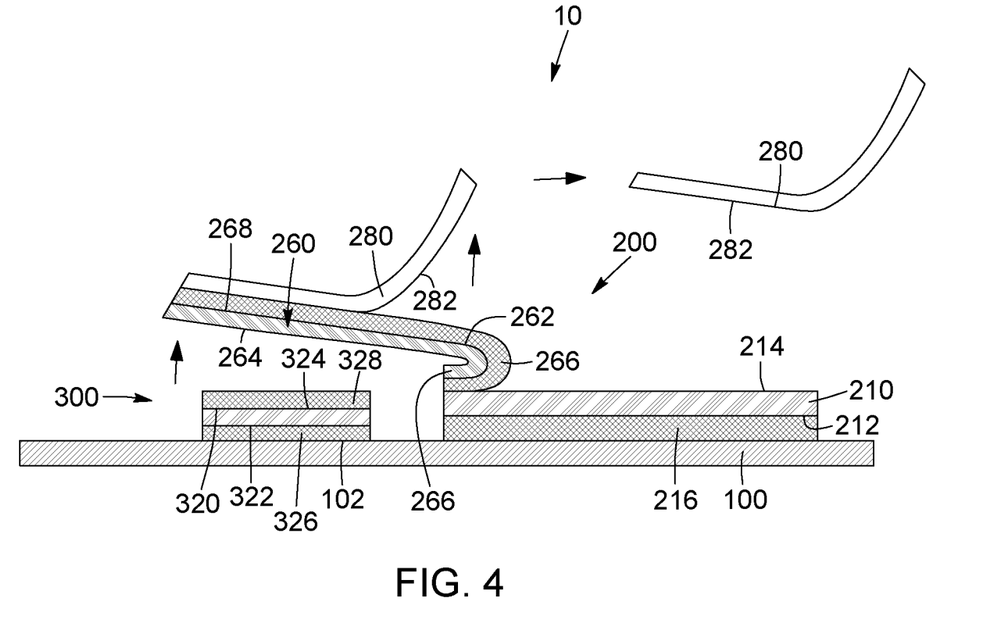
FIG. 4 is a side elevation view of the self-laminating label assembly of FIG. 3, with the laminating facestock of the self-laminating label released from the laminating facestock holder and configured between the non-laminating configuration and a laminating configuration, and with the protective liner released from the laminating facestock.
Figure 5:
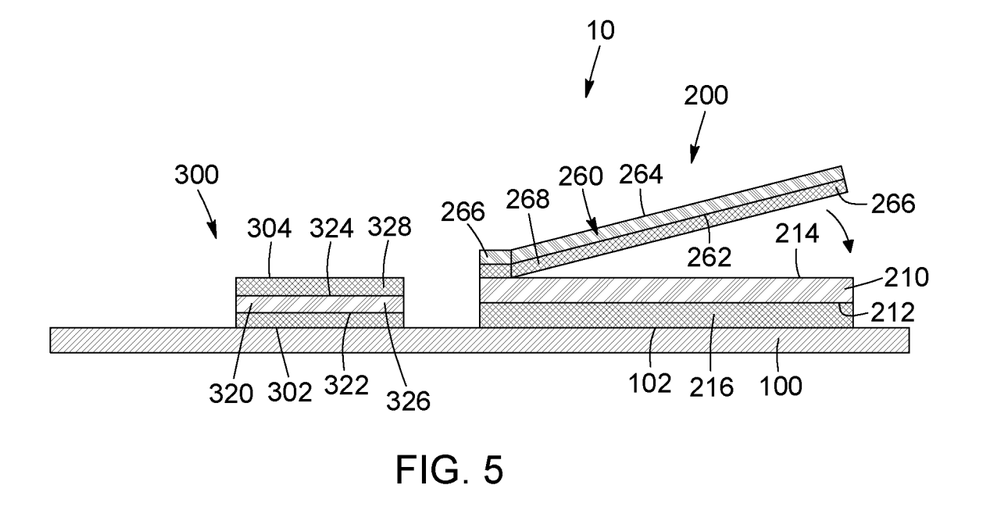
FIG. 5 is a side elevation view of the self-laminating label assembly of FIG. 3, with the laminating facestock configured between the non-laminating configuration and the laminating configuration.

In embodiments in which the self-laminating label (200) includes a protective liner (280), such as the embodiment illustrated in FIG. 4, the protective liner (280) can be removed from the laminating surface (262) of the laminating facestock (260) prior to lamination.

Once the label facestocks (210) have been laminated, the self-laminating labels (200) can then be released from the label support liner (100) and affixed to a surface that needs to be labelled, as described above, by releasing the laminated label facestocks (210) with the label facestock adhesive (216) from the label receiving surface (102) of the label support liner (100). Once affixed to the surface to be labelled, the self-laminating label (200) can thus be resistant to chemicals, solvents, liquids, and all kind of other exposures, depending on the composition of the laminating facestock (260).

In another embodiment, instead of the label facestocks (210) being laminated and then released from the label support liner (100), the self-laminating label (200) can first be released from the label support liner (100) and affixed to the surface to be labelled, and then, the facestock upper surface (214) of the label facestock (210) can be laminated by moving the laminating facestock (260) to its laminating configuration.

Allowing the laminating facestocks (260) to be configured in their non-laminating horizontal configuration, where the laminating facestocks (260) are releasably affixed to the label support liner (100) via adhesive (400) or static cling, for example, or alternatively, to the laminating facestock holder(s) (300, 501 or 601), can thus improve the printing process. Indeed, instead of feeding the printer with the laminating facestocks (260) of the self-laminating labels (200) in a configuration between the non-laminating configuration and the laminating configuration (i.e., at an angle from the horizontal axis), which can damage not only the laminating facestocks (260), but also the whole self-laminating label assembly (10), the printer can be fed with the laminating facestocks (260) being releasably affixed to the label support liner (100), or alternatively, to the laminating facestock holder(s) (300, 501 or 601), which can increase the efficiency of the printing process (e.g., reduced number of printer jams, increased printing quality, reduced printing time, etc.). The self-laminating label assemblies (10) described above can also help a user to hand write on a label facestock (210) prior to its release from the liner (100) and lamination, as the laminating facestock (260) can be maintained in the non-laminating configuration, away from the user's hand, for example.

Since a peripheral edge region (266) of the laminating facestock (260) is mounted on the corresponding label facestock (210), the lamination process can also be facilitated, as the assembly (10) is configured to provide alignment between the corresponding label facestock (210) and the laminating facestock (260) during the laminating process. The end user can thus easily laminate the label facestock (210), prior or after it has been affixed to the surface to be labelled, by folding back the laminating facestock (260) over the label facestock (210) without ever detaching the peripheral edge region (266) from the label facestock (210).

In the present description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Furthermore, in the context of the present description, it will be considered that all elongated objects will have an implicit "longitudinal axis" or "centerline", such as the longitudinal axis of a shaft for example, or the centerline of a biasing device such as a coiled spring, for example, and that expressions such as "connected" and "connectable", "secured" and "securable", "affixed" and "affixable" or "mounted" and "mountable", may be interchangeable, in that the present self-laminating label assembly also relates to kits with corresponding components for assembling a resulting fully-assembled and fully-operational self-laminating label assembly.

Moreover, components of the present self-laminating label assembly and/or steps of the method(s) described herein could be modified, simplified, altered, omitted and/or interchanged, without departing from the scope of the present disclosure, depending on the particular applications which the present self-laminating label assembly is intended for, and the desired end results, as briefly exemplified herein and as also apparent to a person skilled in the art.

In addition, although the embodiments as illustrated in the accompanying drawings comprise various components, and although the embodiments of the present self-laminating label assembly and corresponding portion(s)/part(s)/component(s) as shown consist of certain geometrical configurations, as explained and illustrated herein, not all of these components and geometries are essential and thus should not be taken in their restrictive sense, i.e. should not be taken so as to limit the scope of the present disclosure. It is to be understood, as also apparent to a person skilled in the art, that other suitable components and cooperation thereinbetween, as well as other suitable geometrical configurations may be used for the present self-laminating label assembly and corresponding portion(s)/part(s)/component(s) according to the present self-laminating label assembly, as will be briefly explained herein and as can be easily inferred herefrom by a person skilled in the art, without departing from the scope of the present disclosure.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the terms "including", "comprising", "consisting" and grammatical variants thereof do not preclude the addition of one or more components, features, steps, or integers or groups thereof and that the terms are to be construed as specifying components, features, steps or integers.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. The present invention may be implemented in the testing or practice with methods and materials equivalent or similar to those described herein.

Although the present invention has been described hereinabove by way of specific embodiments thereof, it can be modified, without departing from the spirit and nature of the subject invention defined in the appended claims.

What is claimed is:

1. A self-laminating label assembly comprising:
a label support liner having a label receiving surface; and
a self-laminating label releasably affixed to the label receiving surface and comprising:
  a label facestock having a facestock lower surface releasably affixed to the label receiving surface of the label support liner and a facestock upper surface; and
  a laminating facestock for laminating at least part of the label facestock, the laminating facestock having an external surface releasably affixable to the label support liner and a laminating surface affixable to the facestock upper surface, the laminating facestock being movable between a non-laminating configuration in which only a peripheral edge region of the laminating surface is affixed on the facestock upper surface and in which at least part of the external surface is releasably affixed to the label receiving surface of the label support liner, and a laminating configuration in which the laminating facestock is affixed to, and laminates, at least a section of the facestock upper surface of the label facestock.

2. The self-laminating label assembly of claim 1, further comprising a laminating facestock holder affixed to the label receiving surface, the laminating facestock holder being positioned so as to releasably affix the laminating facestock to the label support liner when the laminating facestock is in the non-laminating configuration.

3. The self-laminating label assembly of claim 2, wherein the laminating facestock holder comprises a holder facestock having a holder facestock lower surface being affixed to the label receiving surface of the label support liner and a holder facestock upper surface, the external surface of the laminating facestock being releasably affixable to the holder facestock upper surface for holding the laminating facestock in the non-laminating configuration.

4. The self-laminating label assembly of claim 3, wherein the holder facestock lower surface of the holder facestock is coated with a holder facestock lower surface adhesive.

5. The self-laminating label assembly of claim 3, wherein the holder facestock upper surface of the holder facestock is coated with a holder facestock upper surface adhesive allowing the laminating facestock to be released from the holder facestock upper surface.

6. The self-laminating label assembly of claim 3, wherein the holder facestock upper surface of the holder facestock is coated with a static cling material allowing the laminating facestock to cling thereto.

7. The self-laminating label assembly of claim 2, wherein the laminating facestock holder is a static cling facestock having a static cling facestock lower surface being affixed to the label receiving surface of the label support liner and a static cling facestock upper surface, the external surface of the laminating facestock being stuck to the static cling facestock upper surface via static cling for holding the laminating facestock in the non-laminating configuration.

8. The self-laminating label assembly of claim 1, wherein the laminating facestock is releasably affixable to the label receiving surface of the label support liner without using adhesive.

9. The self-laminating label assembly of claim 8, wherein at least one of the laminating facestock and the label support liner is made of a static cling material such that when the laminating facestock is in the non-laminating configuration, at least part of the part of the external surface of the laminating facestock can releasably be stuck to the label support liner via static cling.

10. The self-laminating label assembly of claim 1, wherein at least part of the label receiving surface of the label support liner is coated with a release coating.

11. The self-laminating label assembly of claim 1, wherein an entirety of the label receiving surface of the label support liner is coated with a release coating.

12. The self-laminating label assembly of claim 11, wherein the label support liner comprises a first section and a second section, the label receiving surface of one of the first or second section being coated with the release coating, the self-laminating label being releasably affixed to the one of the first or second section that is coated with the release coating.

13. The self-laminating label assembly of claim 1, wherein the facestock lower surface of the label facestock is coated with a label facestock adhesive allowing the label facestock to be released from the label receiving surface of the label support liner and affixed to a surface to be labelled.

14. The self-laminating label assembly of claim 1, wherein the laminating surface of the laminating facestock is coated with a laminating facestock adhesive allowing the laminating facestock to be affixed to the facestock upper surface of the label facestock.

15. The self-laminating label assembly of claim 1, wherein the laminating facestock is one of: transparent, translucent, matte, glossy, and hazy.

16. The self-laminating label assembly of claim 1, wherein the self-laminating label comprises a protective liner releasably affixed to the laminating surface for covering the laminating surface of the laminating facestock.

17. The self-laminating label assembly of claim 16, wherein the protective liner is releasably affixed to laminating surface via an adhesive surface that is at least part of the laminating surface of the laminating facestock.

18. The self-laminating label assembly of claim 1, wherein part of the label receiving surface is coated with a layer of an adhesive material, the external surface of the laminating facestock being releasably affixable thereto when the laminating facestock is on the non-laminating configuration.

19. The self-laminating label assembly of claim 1, wherein the self-laminating label further comprises an intermediate support liner having a support liner lower surface being releasably affixed to the label receiving surface of the label support liner and a support liner upper surface being releasably affixed to the facestock lower surface of the label facestock.

20. The self-laminating label assembly of claim 1, comprising a plurality of self-laminating labels being releasably affixable to the laminating facestock holder when configured in the non-laminating configuration.

21. The self-laminating label assembly of claim 20, further comprising a plurality of corresponding laminating facestock holders, the self-laminating labels each being releasably affixable to a corresponding one of the laminating facestock holders when configured in the non-laminating configuration.

22. The self-laminating label assembly of claim 20, further comprising at least one tear line separating adjacent ones of the plurality of self-laminating labels.

23. The self-laminating label assembly of claim 1, further comprising a communication device.

24. The self-laminating label assembly of claim 23, where the communication device includes at least one of a radio frequency identification (RFID) communication device, a near field communication (NFC) device and a wireless communication device.

25. The self-laminating label assembly of claim 1, wherein:
the facestock lower surface and the facestock upper surface define opposite sides of the label facestock;
the external surface and the laminating surface define opposite sides of the laminating facestock;
the laminating surface and the facestock upper surface are face to face in the peripheral edge region;
the external surface faces away from the label support liner in the laminating configuration; and
the laminating surface and the facestock upper surface are face to face in the laminating configuration.

26. A method for laminating a label facestock of a self-laminating label releasably affixed to a label support liner, the self-laminating label including the label facestock and a laminating facestock comprising a peripheral edge region, the laminating facestock being mounted to the label facestock at the peripheral edge region, the label facestock including a facestock lower surface releasably affixed to a label receiving surface of the label support liner, the method comprising:
providing the laminating facestock in a non-laminating configuration in which at least part of the laminating facestock is releasably affixed to the label receiving surface of the label support liner for holding the laminating facestock thereon; and
moving the laminating facestock to a laminating configuration in which the laminating facestock is affixed to, and laminates, at least partially a facestock upper surface of the label facestock.

27. The method of claim 26, further comprising releasing the label facestock from the label receiving surface of the label support liner.

28. The method of claim 27, further comprising affixing the label facestock to a surface to be labelled.

* * * * *